United States Patent
Montoya (10) Patent No.: US 8,557,159 B2
(45) Date of Patent: Oct. 15, 2013

(54) METHOD FOR FORMING HOLLOW FIBER BUNDLES

(75) Inventor: Jean Patrick Montoya, Ann Arbor, MI (US)

(73) Assignee: MedArray, Inc., Ann Arbor, MI (US)

( * ) Notice: Subject to any disclaimer, the term of this patent is extended or adjusted under 35 U.S.C. 154(b) by 393 days.

(21) Appl. No.: 12/915,262

(22) Filed: Oct. 29, 2010

(65) Prior Publication Data

US 2011/0111126 A1 May 12, 2011

Related U.S. Application Data (60) Provisional application No. 61/259,191, filed on Nov. 8, 2009.

(51) Int. Cl.
*B29C 33/76* (2006.01)

(52) U.S. Cl.
USPC .......................... 264/263; 264/317; 264/308

(58) Field of Classification Search
USPC .................................. 264/313, 302; 425/435
See application file for complete search history.

(56) References Cited

U.S. PATENT DOCUMENTS

| | | | |
|---|---|---|---|
| 3,445,321 A | 5/1969 | Groves | |
| 3,564,661 A | 2/1971 | Atwell | |
| 3,687,795 A | 8/1972 | Elkin | |
| 3,722,695 A | 3/1973 | Sargent et al. | |
| 3,794,468 A | 2/1974 | Leonard | |
| 4,022,692 A | 5/1977 | Janneck | |
| 4,182,582 A | 1/1980 | Youval et al. | |
| 4,213,858 A | 7/1980 | Boberg et al. | |
| 4,342,723 A | 8/1982 | Sado et al. | |
| 4,585,830 A | 4/1986 | Sweet | |
| 4,624,874 A * | 11/1986 | Schutze | 428/34.9 |
| 4,670,313 A | 6/1987 | Saudagar | |
| 4,690,844 A | 9/1987 | Saudagar | |
| 4,911,846 A | 3/1990 | Akasu et al. | |
| 4,957,508 A | 9/1990 | Kaneko et al. | |
| 5,002,666 A | 3/1991 | Matsumoto et al. | |
| 5,043,140 A | 8/1991 | Combs | |
| 5,096,646 A | 3/1992 | Shigemoto et al. | |
| 5,162,101 A | 11/1992 | Cosentino et al. | |
| 5,171,735 A | 12/1992 | Chien | |
| 5,188,801 A | 2/1993 | Fini | |
| 5,192,320 A | 3/1993 | Anazawa et al. | |
| 5,230,862 A | 7/1993 | Berry et al. | |
| 5,297,591 A * | 3/1994 | Baurmeister | 139/383 R |

(Continued)

FOREIGN PATENT DOCUMENTS

| | | |
|---|---|---|
| JP | 3-30889 | 2/1991 |
| JP | 3-135422 A | 6/1991 |
| JP | 10 266014 A | 10/1998 |

*Primary Examiner* — Galen Hauth
(74) *Attorney, Agent, or Firm* — Gifford, Krass, Sprinkle, Anderson & Citkowski, P.C.; Douglas L. Wathen (57) ABSTRACT

A method of forming a plurality of hollow fibers includes the step of providing an elongated flexible substantially continuous fiber and coating an outer surface of the fiber with a hollow fiber material. The hollow fiber material is cured or hardened. A gap is created between the outer surface of the support fiber and the inner surface of the coating layer defined thereon. The coated support fiber is cut into a plurality of fiber segments each having exposed ends. The support fiber segments are removed from the coating layer so as to provide a plurality of hollow fibers.

28 Claims, 7 Drawing Sheets

(56) References Cited

U.S. PATENT DOCUMENTS

| | | |
|---|---|---|
| 5,312,589 A | 5/1994 | Reeder et al. |
| 5,405,695 A | 4/1995 | Akatsu et al. |
| 5,405,698 A | 4/1995 | Dugan |
| 5,445,771 A | 8/1995 | Degen |
| 5,489,413 A | 2/1996 | Carson et al. |
| 5,565,166 A | 10/1996 | Witzko et al. |
| 5,637,224 A | 6/1997 | Sirkar et al. |
| 5,698,161 A | 12/1997 | Montoya |
| 5,876,650 A | 3/1999 | Burlone et al. |
| 6,113,722 A | 9/2000 | Hoffman et al. |
| 6,455,156 B1 | 9/2002 | Tanaka et al. |
| RE41,870 E | 10/2010 | Montoya |
| 2003/0197308 A1* | 10/2003 | Montoya ............... 264/263 |
| 2006/0118994 A1* | 6/2006 | Eshraghi et al. ......... 264/166 |

* cited by examiner

METHOD FOR FORMING HOLLOW FIBER BUNDLES

REFERENCE TO RELATED APPLICATION

This U.S. Utility patent application claims priority from U.S. Provisional Patent Application Ser. No. 61/259,191, filed Nov. 8, 2009, the entire content of which is incorporated herein by reference.

STATEMENT OF GOVERNMENT SPONSORSHIP

This invention was made with government support under Grant No. 5 44 HL068375-07 awarded by the National Institutes of Health. The government has certain rights in this invention.

BACKGROUND OF THE INVENTION

Hollow fibers or microtubes of different materials can be used in many applications, depending on the hollow fiber material properties. Hollow fibers can be used in mass transfer devices, if the walls of the hollow fibers are permeable, and as heat transfer devices if the walls of the hollow fibers are heat conductive. Because hollow fibers are small, their thin walls pose relatively little barrier to heat and mass transfer between the inside and outside of the hollow fiber. It also becomes possible to package a large surface area for heat and mass transfer in relatively small volumes by densely bundling multiple hollow fibers into small packages. Examples of hollow fiber bundles used in heat and mass transfer include commercially available blood oxygenators which comprise a mass transfer portion with gas permeable hollow fibers, and a heat transfer portion with a heat conducting hollow fibers.

Montoya U.S. Reissue patent application Ser. No. 11/175,104, filed Jul. 5, 2005, now RE 41,870, issued Oct. 26, 2010, describes a method for forming hollow fiber bundles using a dissolvable core. The entire contents of this application are incorporated herein by reference, as some of the methods and descriptions therein may have utility in the present application, or may be useful in combination herewith. The method in the prior application can become time consuming to practice when the ratio of the diameter of the hollow fibers to the length of the bundle becomes very small, because it becomes increasingly slower to remove the dissolved support through small diameter and long passageways. Moreover, there are applications where the potential of trace residues of the support material or the solvent are not desirable in the resulting hollow fibers. In an effort to overcome these limitations, the following method for forming hollow fiber bundles comprising the following steps is presented.

SUMMARY OF THE INVENTION

The present invention provides improved methods for forming hollow fibers. According to one embodiment, the method includes the steps of providing an elongated flexible substantially continuous support fiber having an outer surface. The outer surface of the support fiber is coated with a hollow fiber material. The hollow fiber material coating is cured or hardened on the outer surface so as to form a substantially continuous and uniform coating layer on the outer surface of the support fiber. The coating layer has an inner surface adjacent to the outer surface of the support fiber. A gap is created between the outer surfaces of the support fiber and the inner surface of the coating layer defined thereon. The coated support fiber is cut into a plurality of fiber segments each having exposed ends. The support fiber segments are removed from the coating layer so as to provide a plurality of hollow fibers.

In some versions, the cutting step is performed prior to the gap creating step, while in other versions the gap creating step is performed prior to the cutting step.

The outer surface of the support fiber has an outer dimension and the inner surface of the coating layer has an inner dimension. In some versions, the step of creating a gap between the outer surface of the support fiber and the inner surface of the coating layer is accomplished with at least one gap creating process selected from a group consisting of: expanding the cured coating layer so as to increase the inner dimension; contracting the support fiber so as to decrease the outer dimension; and using a pressurized fluid to penetrate between the outer surface of the support fiber and the inner surface of the coating layer.

In some versions, the gap creating step comprises expanding the cured coating layer by swelling the cured coating layer by exposing it to a substance operable to swell the cured coating, layer, thereby increasing an inner dimension of the coating layer. The substance may comprise xylene or toluene. That method may further include the step of evaporating the substance operable to swell the cured coating layer.

In some embodiments, the gap creating step comprises contracting the support fiber such that an outer dimension of the support fiber is reduced. The contracting step is accomplished by a contracting method. One contracting method includes providing a support fiber with an outer dimension that expands with temperature, the support fiber being at a first temperature during coating with the hollow fiber material and the support fiber being at a second lower temperature for creation of the gap. This method further comprises cooling the support fiber from the first temperature to the second temperature. A second contracting method includes providing the support fiber foamed of a heat shrinkable material and heating the support fiber so as to reduce the outer dimension. A third method includes stretching the support fiber relative to the outer coating layer, thereby reducing the outer dimension.

In some versions of the present invention, the gap creating step comprises using pressurized fluid to penetrate between the outer surface of the support fiber and the inner surface of the cured coating layer. The fluid comprises a low surface tension, low viscosity lubricant. This fluid may be isopropyl alcohol. The method may further include the step of applying at least a partial backing to the cured coating layer during the gap created step. The method may also further include the step of using a fluid that causes swelling of the coating layer.

In some versions, the step of removing the support fiber comprises pushing the support fiber out of the cured coating layer with the fluid.

In some embodiments, the method further includes the steps of forming the coated support fiber into a bundle having an end, potting the end of the bundle in a potting material so as to form a potted end, and cutting the potted end so as to cut the end of the bundle of coated support fiber, thereby cutting the coated support fiber into a plurality of coated support fiber segments each having an end. In some versions, the gap creating step is performed prior to the bundle forming step and in other versions the gap creating step is performed after the cutting of the potted end.

In some embodiments, the method further comprises the steps of forming the plurality of coated support fiber segments into a bundle having an end, potting the end of the bundle in a potting material so as to form a potted end, and cutting the potted end so as to expose ends of the fiber segments. The step of forming the coated fiber into a bundle may be accomplished by winding the coated support fiber into a bundle or knitting a plurality of coated fibers into a mat and spirally winding the mat into a bundle, or other approaches. This embodiment of the invention may further include the steps of attaching a body of material to the support fibers so that the exposed ends of the fiber segments with the potted end and moving the body of material away from the potted end such that the support fibers are stretched. The stretching of the support fibers causes an outer dimension of the support fibers to be reduced, thereby creating the gap.

In some versions of the present invention, the outer surface of the support fiber is cylindrical with a substantially constant diameter. In some versions of the present invention, the hollow fiber material is silicone. In further versions, the support fiber is hollow.

In some embodiments, the coating step comprises providing a coating dye and passing the support fiber through the coating dye. The coating step may comprise coating the support fiber with multiple coating layers. The multiple coating layers may include at least two different coating materials.

In some embodiments of the present invention, the method further comprises forming the plurality of coated support fiber segments into a bundle having a first and a second end. The first end of the bundle is potted in a potting material so as to form a first potted end. The second end of the bundle is potted in a first material, thereby forming a first potting layer. The first potting layer is bonded to the second end of the bundle. The second end of the bundle is further potted in a second material, inboard of the first potting layer. This forms a second potting layer. The second potting layer is bonded to the coating layers of the bundle, but not to the first potting layer. The first potting layer is moved away from the second potting layer such that the coating layer between the first and second potting layers separate and the support fibers are stretched. The stretching of the support fibers causes an outer dimension of the support fibers to be reduced, thereby creating a gap. In some versions, the coated support fibers are cut prior to forming the first potting layer, such that the ends of the fiber segments at the second end of the bundle are exposed.

In accordance with a further embodiment of the present invention, a method of forming hollow fiber bundles includes the step of providing an elongated flexible substantially continuous support fiber having an outer surface. The outer surface of the support fiber is coated with a hollow fiber material. The hollow fiber material is cured or hardened on the outer surface so as to form a substantially continuous and uniform coating layer on the outer surface of the support fiber. The coating layer has an inner surface adjacent to the outer surface of the support fiber. The coated support fiber is formed into a bundle having an end and the end is potted in a potting material so as to form a potted end. The potted end is cut so as to sever the end of the bundle of coated support fibers and create a plurality of coated support fiber segments each having an exposed end. A gap is created between each support fiber segment in the cured layer defined on the outer surface thereof. The support fiber is removed from the cured layer so as to provide a bundle of hollow fibers.

DETAILED DESCRIPTION OF THE INVENTION

The present invention provides several methods for forming hollow fibers. Generally, these methods include the steps of providing a support fiber, coating the fiber with a material for forming the hollow fiber, and then removing the support fiber from the coating layer, thereby leaving a hollow fiber. In order the remove the support fiber, a gap is created between the inner surface of the coating layer and the outer surface of the support fiber. The present invention includes multiple embodiments of novel approaches to creating the gap. The present invention also includes multiple embodiments of novel approaches to removing the support fiber. In some embodiments, the coated fiber is cut into segments prior to the gap creation step, while in others the fiber is cut following the gap creation step. In some embodiments, the coated fiber or coated fiber segments may be formed into a bundle and one or both ends of the bundle may be potted in a potting material. The potted end may be cut, thereby exposing cut ends of the fiber segments. Gap creation may occur before or after potting, and before or after cutting the potted ends.

Figure 1:
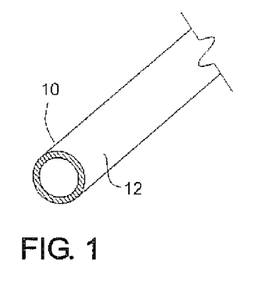
FIG. 1 shows an exemplary hollow support fiber for use with some embodiments of the present invention.

A method in accordance with the present invention starts with providing an elongated substantially continuous support fiber, such as shown in FIG. 1. The support fiber 10 is shown as hollow in FIG. 1, but it may be solid. The support fiber is defined herein as being elongated and substantially continuous. For purposes of this invention, such an elongated substantially continuous fiber is so long that it may be treated as not having an end. The fiber may be provided on a large roll containing hundreds or thousands of meters, and subsequent rolls may be fed continuously into the process by attaching the end of one roll to the start of another. The support fiber is also flexible such that it can be rolled or bundled, both before and after coating.

The support fiber has an outer surface 12 with a shape that is substantially similar to the shape of the inner surface of the desired resulting hollow fiber. In the illustrated embodiment, the outer surface is cylindrical, but in other embodiments it may have other shapes, such as oval, square or rectangular in cross section. The outer surface of the support fiber may be said to have an outer dimension. For the illustrated shape, the outer dimension is its outer diameter or radius. For a fiber having a square cross section, the outer dimension may be its width or its corner to corner measurement.

Figure 2:
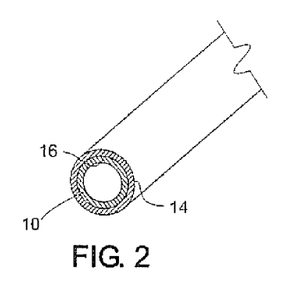
FIG. 2 shows a support fiber coated with a coating layer forming a coated fiber.

The support fiber is coated with a hollow fiber material to form a substantially continuous and uniform coating layer 14 on the outer surface of the support fiber. By referring to this layer as being substantially continuous and uniform, it is meant that the layer has a substantially continuous and uniform thickness and other characteristics along the length of the support fiber. As will be clear to those of skill in the art, in some embodiments the layer may have a non-uniform thickness in cross section. For example, with an oval or square support fiber, the layer may be thinner in some areas, such as at the corners of the square support fiber. This coating layer is then cured or hardened to a substantially solid material, as shown in FIG. 2. The support fiber with a coating layer is referred to as a coated fiber. The inner surface 16 of the coating layer 14 may be said to be adjacent the outer surface 12 of the support fiber 10 at this point in the process. As shown, the surfaces are adjacent and touching around the entirety of the outer surface of the support fiber due to the coating layer having been applied directly to the outer surface.

The coating material may be applied in a substantially continuous process where the support fiber is passed though a coating die of the kind well known in the art, such as the type used for coating wires, e.g., a centering crosshead die. Multiple coating layers of the same coating material can be applied, or of different coating materials can be applied to form a composite hollow fiber. Exemplary materials that may be used with the present process include, but are not limited to, polyurethane (useful for heat transfer applications), fluorinated polymer (useful for solvent resistance in heat and mass transfer applications), and PVOH (polyvinyl alcohol)/silicone (providing a composite useful for selective water vapor permeation).

It is preferred that the support fiber be made from a material to which the coating material does not substantially stick when cured or hardened, that is, no substantial bond is formed between the coating layer and the support fiber when the coating material cures or hardens.

Figure 3:
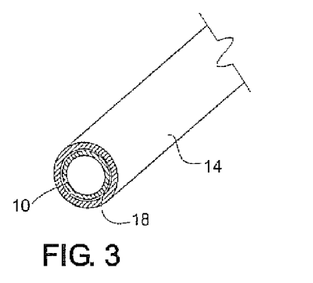
FIG. 3 shows a coated fiber with a gap formed between the support fiber and the coating layer.

In accordance with embodiments of the present invention, the support fiber and the cured coating layer combination provide for the formation of a gap at the interface between the support fiber and the coating layer. Several methods for forming the gap will be described below. For purposes of this invention, a gap refers to a disruption between the outer surface of the support fiber and the inner surface of the coating layer that will allow a fluid to penetrate in between the support fiber and the cured coating layer. The gap may be only in some areas around the perimeter of the outer surface, or may be at all locations. FIG. 3 illustrates a support fiber 10 and a coating layer 14 with a gap 18 defined therebetween. The fluid may be a gas such as air or a liquid such as a lubricant. The gap 18 will facilitate the eventual extraction of the support fiber 10 from within the coating layer 14. The gap may be formed anytime after the coating layer is substantially cured. For example, it may be formed immediately following curing of the coating layer, before or after cutting the coated fiber into segments, and before or after potting the bundle, or any time in between these other steps.

Figure 4:
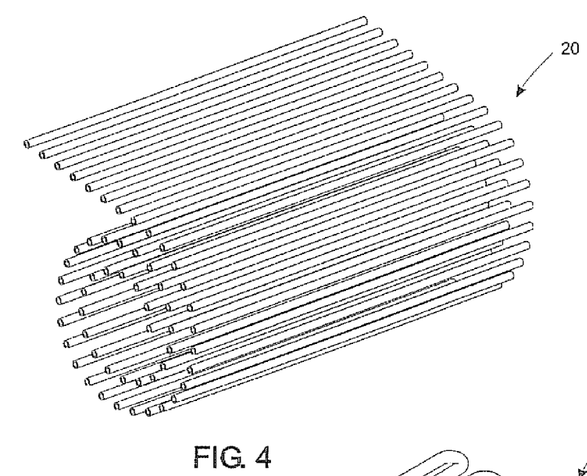
FIG. 4 shows an array of hollow fibers spirally wound into a bundle.
Figure 5:
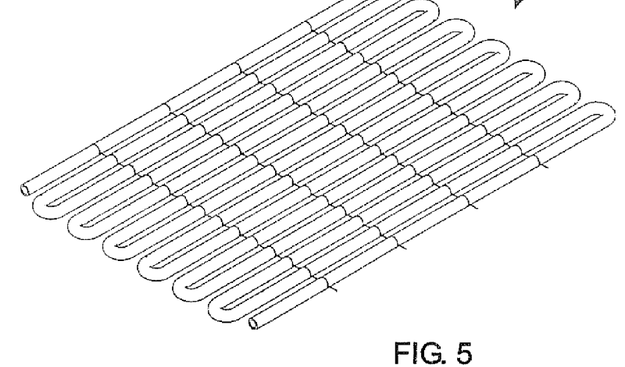
FIG. 5 shows a hollow fiber mat knitted from a single hollow fiber.

The coated fiber may be cut into coated fiber segments at any stage. The coated fibers or coated fiber segments may be formed into a bundle in several ways. A number of coated fibers or segments may be assembled into a coated fiber bundle using methods well known in the art, such as knitting the coated fibers into a mat or array of coated fibers, or spirally winding the mat of coated fibers into a bundle 20 as shown in FIG. 4. The coated fibers or fiber segments in the bundle extend the length of the bundle between both ends of the bundle. Note that the entire bundle can be formed using a single coated fiber, either by winding a single fiber into a bundle, like winding an elongated ball or tube of twine, or bundling a mat knitted from a single coated fiber back and forth (with looped ends) 22 as shown in FIG. 5.

Figure 6:
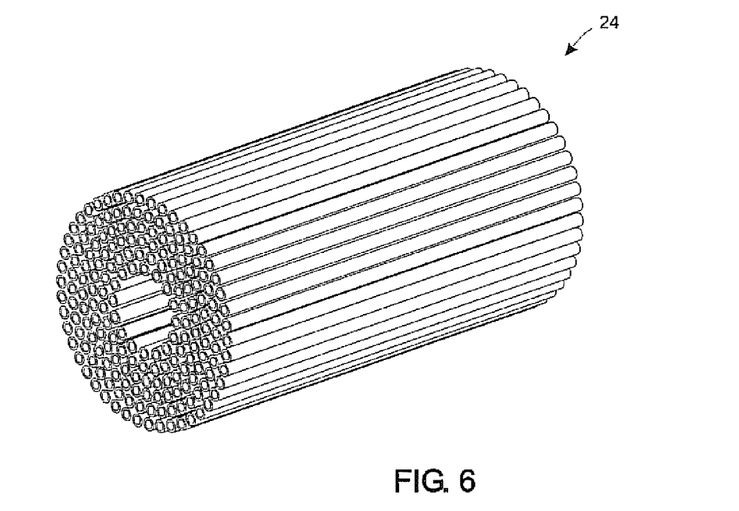
FIG. 6 shows a non-potted bundle of hollow fibers cut at both ends.

The bundle can also be formed by assembling a plurality of pre-cut (to bundle length) coated fiber segments into a bundle 24 such as shown in FIG. 6.

In some embodiments, the support fiber is preferably left within the cured coated layer when forming the bundle of coated fibers. However, it is possible to remove the support fiber at any time after the gap is formed between the support fiber and the coated layer, and the coated fibers are cut thus exposing the support fibers to enable extraction.

Figures 7, 8:
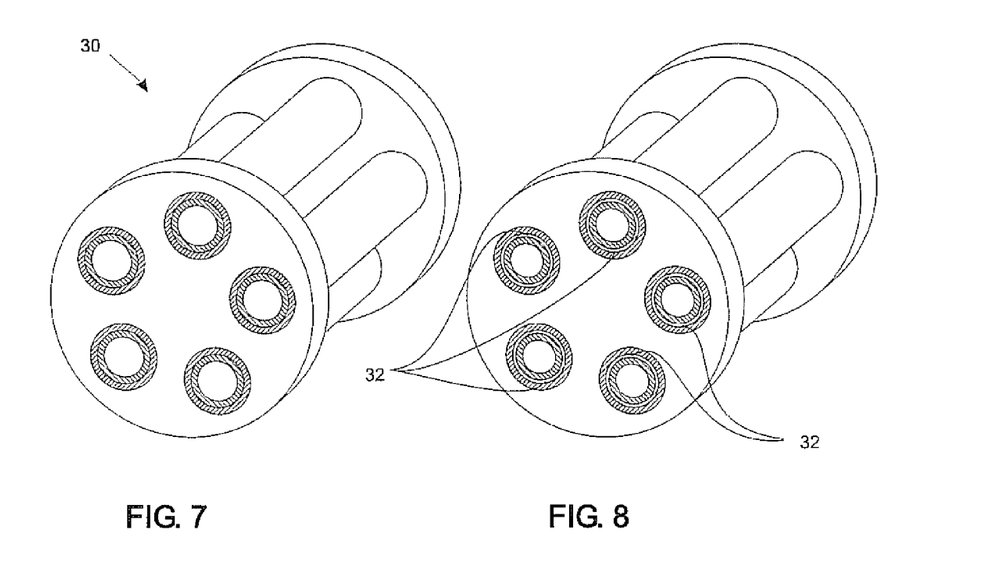
FIG. 7 shows a bundle of five coated fibers potted and cut at both ends with the support fiber exposed.
FIG. 8 shows a bundle of five coated fibers with a gap formed between the support fibers and the coated layer.

In embodiments in which the support fiber remains within the coating layer for potting, the coated fibers in the bundle are fixed and sealed at least at one end of the fiber bundle. This may be accomplished by potting the bundle of coated fibers at one or both ends of the bundle. To expose the support fiber, the coated fiber bundle is cut through the potted ends. FIG. 7 shows a bundle 30 of 5 coated fibers potted at both ends with the support fibers exposed at the potted end.

Figure 9:
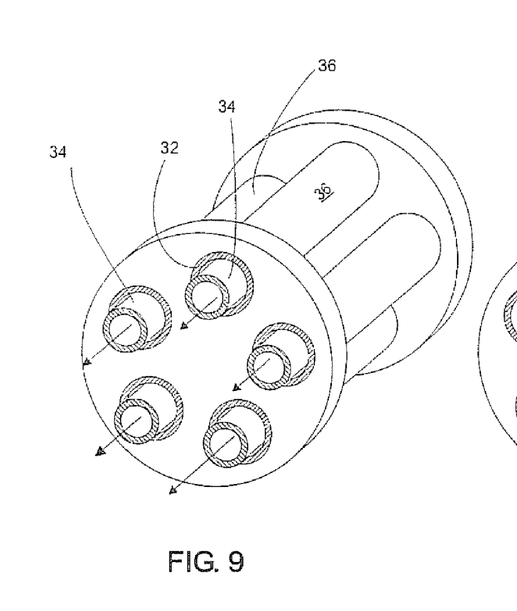
FIG. 9 shows a support fiber being extracted from each coated fiber.
Figure 10:
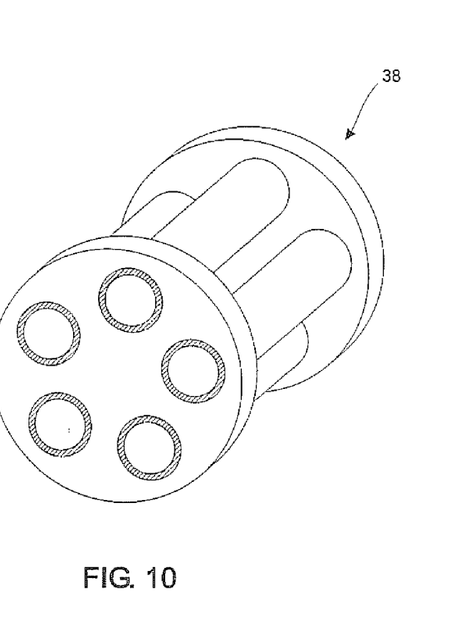
FIG. 10 shows a bundle of five hollow fibers potted at both ends.

If the gap has not already been formed, the interface between the support fiber and the coating layer is disrupted thus enabling a fluid to penetrate in the gap 32, shown in FIG. 8. As shown in FIGS. 9 and 10, the gap 32 facilitates extraction of the support fibers 34 from within the coated fibers 36 which may be accomplished by any suitable method such as blowing, pushing, or pulling the support fiber out of the coated fiber. Once the support fibers are extracted, a potted bundle of hollow fibers 38 remains.

In one preferred embodiment of the invention, the support fiber is made from a material that is expanded in diameter when the coating layer is cured. The support fiber is subsequently contracted thus disrupting the interface between the support fiber and the cured coating layer thereby allowing the support fiber to be removed.

This can be accomplished by several methods including using a support fiber material which expands when its temperature increases (i.e., materials with positive coefficient of thermal expansion) such that the coating layer is cured (or hardened) while the support fiber is thermally expanded, and then cooled to contract the support fiber and disrupt the interface with the cured coating layer. Materials with high linear coefficient of thermal expansion (CTE) such as polyolefins and polyesters are suitable for the support fiber, preferably with a CTE higher than $250 \times 10^{-6}$ cm/cm° C. In one example, the support fiber, such as a polymeric extruded rod or fiber with minimal or no molecular orientation, is passed through a coating die and is heated to a first temperature, wherein the support fiber may be said to be expanded. That is, its outer dimension has a first value. The heating of the fiber may occur prior to passing through the die, while in the die, following the die, or a combination. The coating layer is then cured at this first temperature, creating a coating layer with an inner surface having in inner dimension matching the first value. The coated fiber is then cooled to a second temperature wherein the support fiber contracts such that the outer surface has an outer dimension with a second value, which is smaller than the first value. Depending on the coating material or materials forming the coating layer, the coating layer may also contract. However, it is preferred that the material forming the support fiber has a higher linear coefficient of thermal expansion (CTE) than the material or materials forming the coating layer. For example, in some embodiments, the CTE for the coating layer material is less than or equal to $250 \times 10^{-6}$ cm/cm/° C., while the CTE for the support fiber material is greater than or equal to $300 \times 10^{-6}$ cm/cm/° C. In other examples, the ratio of the CTE for the support fiber material to the CTE of the coating layer material is at least 1.5 to 1, and in further preferred embodiments, the ration is at least 2.0 to 1. An example of materials that meet these limitations are a filled silicone (CTE of $200 \times 10^{-6}$ cm/cm/° C.) for the coating layer material and PEN/PET copolyester (CTE of $400 \times 10^{-6}$ cm/cm/° C.) for the support fiber material. In some embodiments, the first temperature is in the range of 120° C. to 180° C. and the second, lower, temperature is in the range of 15° C. to 30° C. It should be noted that if the support fiber was extruded, it is preferable that it have minimal or no molecular orientation which may cause the length to shrink and the outer dimension to expand upon exposure to the first temperature.

In another preferred embodiment of the present invention, a gap may be formed by using a support fiber that is a heat shrink tubing. The coating layer is applied and cured on the support fiber at a first temperature below the temperature that causes the support fiber to shrink. Then, the coated fiber is heated to a higher temperature that causes the heat shrink tubing to shrink, reducing the outer dimension from a higher value to a lower value. This disrupts the interface between the support fiber and the coating layer, creating a gap. In this method, the heat shrink support fiber is preferentially hollow as shown in FIGS. 1 and 2. Heat shrink materials and processes of this kind are well known in the art and can be used for this purpose. For example, a flexible polyolefin, polyester (PET), or a high temperature ultra flexible fluoroelastomer type heat shrink tubing would be a suitable heat shrink material for the support fiber. The heat shrink step may occur during the continuous process wherein the support fiber is coated, the coating is cured, and then the support fiber is shrunk by exposing it to higher heat. Or, the heat shrink step may occur at a later stage, including after cutting the coated fiber into segments. Alternatively, heat can be applied to a bundle of coated fibers to shrink the support fibers. In some embodiments, the temperature at which curing of the coating layer occurs is in the range of 100° C. to 150° C. and the temperature at which the support fiber material heat shrinks is in the range of 150° C. to 190° C.

If the coating material is cured with heat, the temperature to initiate shrinking of the support fiber should be higher than the cure temperature of the coating material, or should be preferentially reached after the coating layer is substantially cured (i.e., self supported).

Figure 11A:
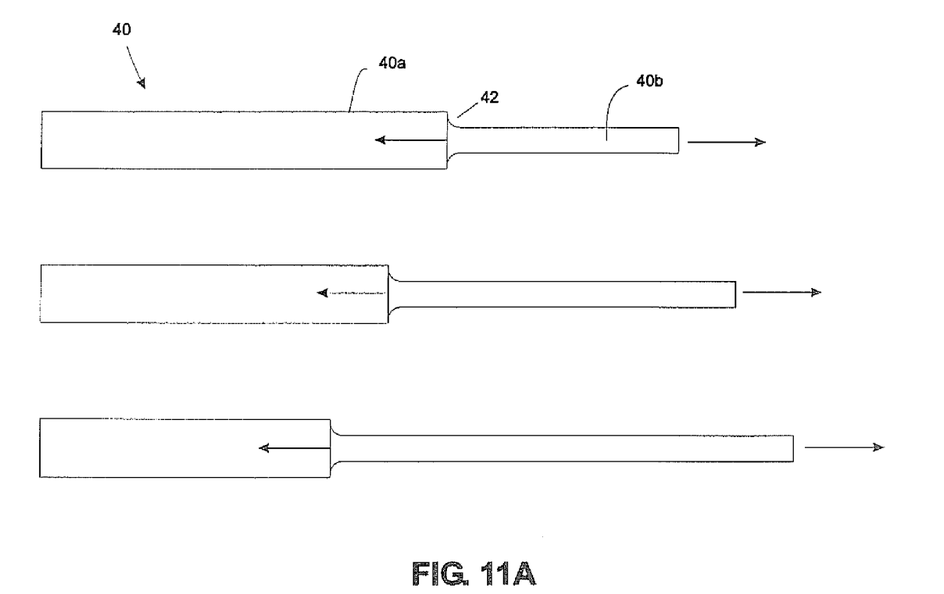
FIG. 11A shows a series of three support fibers being stretched in order to reduce an outer dimension of the support fibers.
Figure 11B:
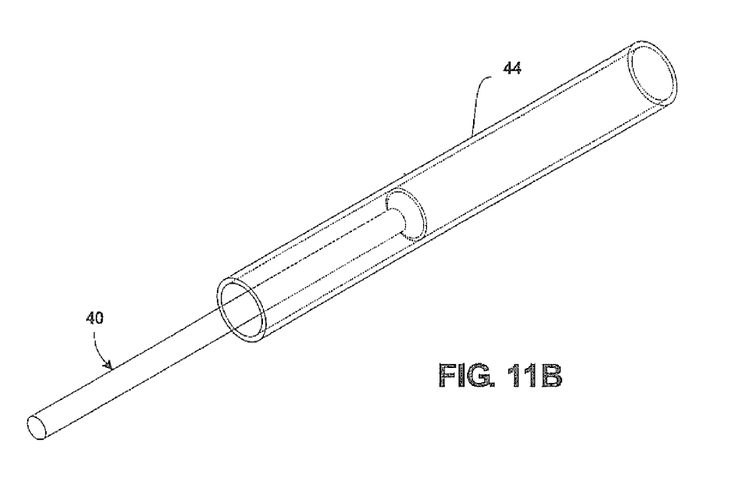
FIG. 11B is a perspective view, partially in phantom lines, of a support fiber being removed from a coating layer by stretching the support fiber.

Another preferred method of contracting the support fiber, thereby reducing its outer dimension, is to stretch the support fiber, preferably to the point of necking in which a neck of smaller outer dimension is formed by cold drawing a minimally oriented or non-oriented support fiber upon applying sufficient tensile stress. As shown in FIG. 11A, when a yielding tensile stress is applied to a support fiber 40, a neck 42 is formed and propagates through the entire support fiber, thus reducing the outer dimension of the support fiber. The support fiber 40 may be said to have a first section 40a wherein the outer dimension, in this case the diameter, has a first value and a second section 40b wherein the outer dimension has a second lower value due to the necking and stretching of the support fiber. This behavior is familiar at room temperature in semi crystalline polymers such as polyethylene, polyethylene terephthalate (PET), polypropylene, and nylon. In accordance with this method, the support fiber is elongated and is made from a material that reduces its outer dimension when stretched. FIG. 11B provides a perspective view of a support fiber 40 being removed from a coating layer 44 by stretching the support fiber so as to reduce its outer dimension.

Figure 12:
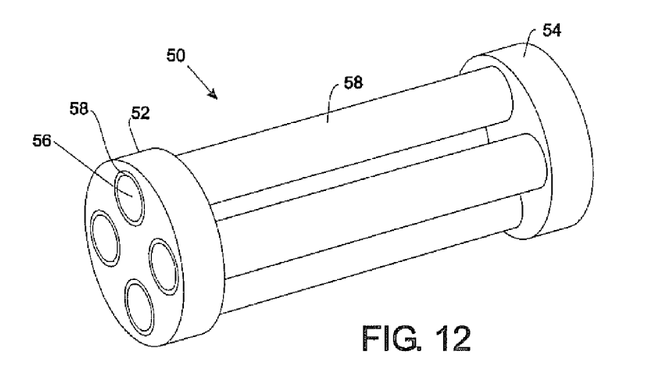
FIG. 12 shows a bundle of coated support fibers with both ends of the bundle potted with a first material.
Figure 13:
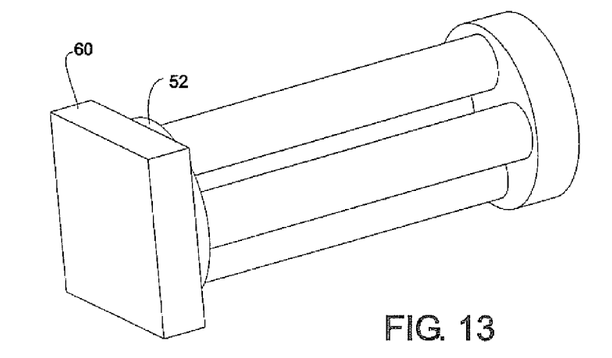
FIG. 13 shows the bundle of FIG. 12 with a second material disposed adjacent one potted end.
Figure 14:
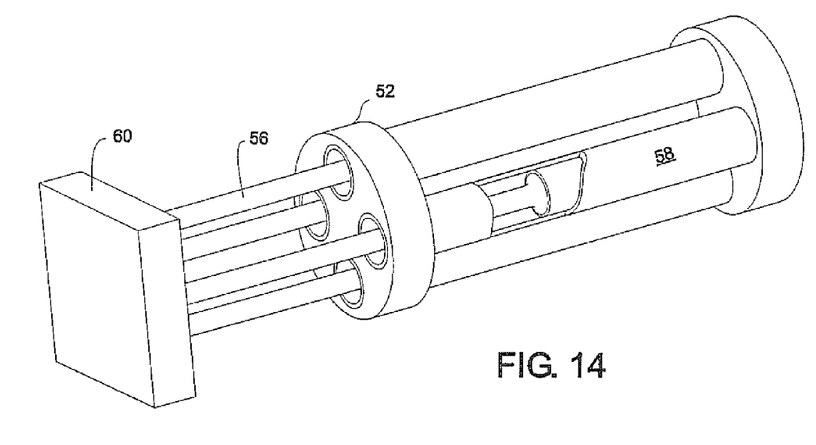
FIG. 14 shows the bundle of FIGS. 12 and 13 with the second material being moved away from the first material so as to extract the support fibers from the coating layer.
Figure 15A:
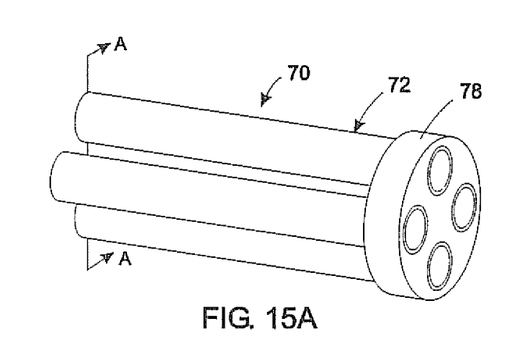
FIG. 15A is a perspective view of a bundle of coated fibers that are potted at one end.
Figure 15B:
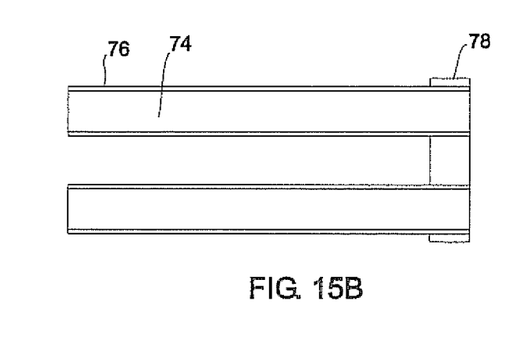
FIG. 15B is a cross sectional view of the bundle of FIG. 15A, taken along lines A-A.
Figure 16A:
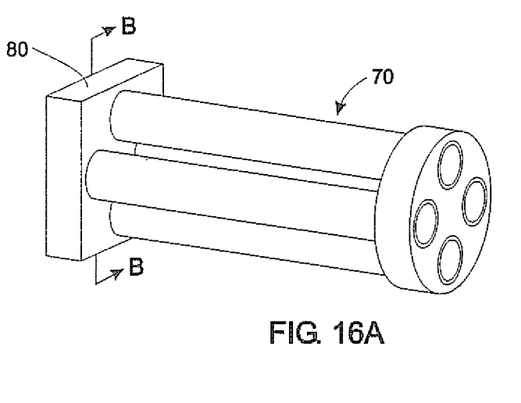
FIG. 16A is a perspective view of the bundle of FIGS. 15A and 15B with the second end of the coated fiber bundle potted with a first material.
Figure 16B:
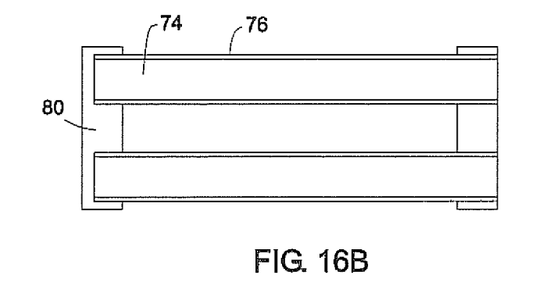
FIG. 16B is a cross sectional view of the bundle of FIG. 16A, taken along lines B-B.
Figures 17A, 17B, 18A, 18B:
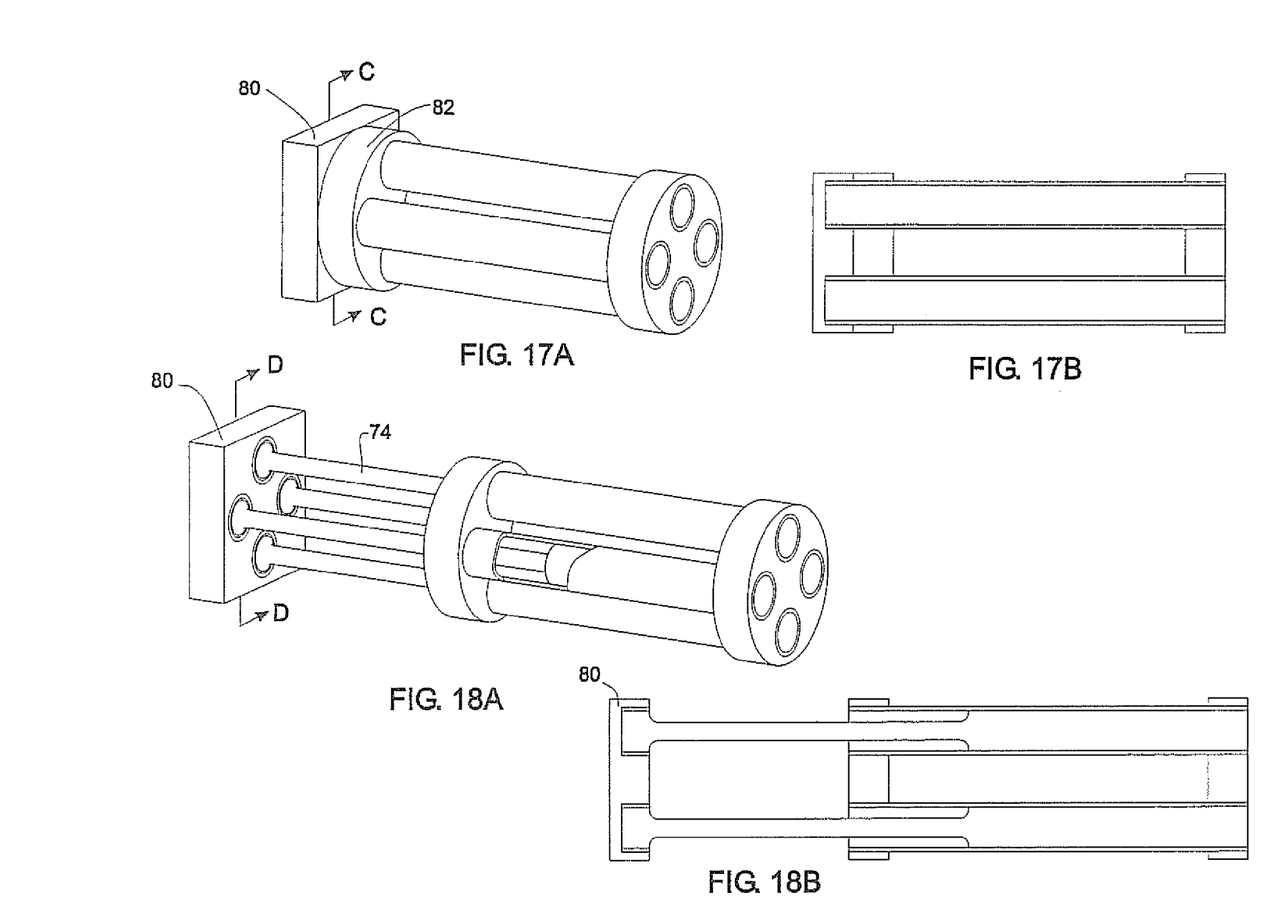
FIG. 17A is a perspective view of the bundle of FIGS. 15 and 16 with the second end of the coated fiber bundle further potted with a second material.
FIG. 17B is a cross sectional view of the bundle of FIG. 17A, taken along lines C-C.
FIG. 18A is a perspective view of the bundle of FIGS. 15-17 with the first material being moved away from the second material so as to remove the support fibers from the coating layers.
FIG. 18B is a cross sectional view of the bundle of FIG. 18A, taken along lines D-D.

In one approach, the coated fiber is formed into a bundle and potted at both ends. Then the support layer is exposed by cutting through the potting at one or both ends. FIG. 12 shows a bundle 50 of coated fibers having potted ends 52 and 54. Each coated fiber includes a support fiber 56 and a coating layer 58. In the illustrated embodiment, the support fibers 56 are solid, but they may be hollow in other embodiments. As shown in FIG. 13, a block 60 formed from a suitable material, such as an epoxy or polymer melt, is molded or cast adjacent one potted end 52 so as to bond or fuse to the exposed support fibers 56, but not to the potting material 52 or the exposed coating layer 58. A suitable polymer melt may be of the same polymer as the support fiber itself. Once the formed block 60 is cured or hardened, and fused or bonded to the support fibers 56, the formed block is 60 pulled away from the potted end 52 so as to stretch the support fibers 56 to initiate necking. The process is further illustrated in FIG. 14, with one of the coating layers partially cut away so as to show the necking of the support fiber. As the formed block 60 is pulled further, the necks with reduced outer dimension propagate into the coated fiber effectively propagating the gap between the support fiber and the coated layer from one potted end to the other as shown in FIG. 14.

FIGS. 15-18 illustrate another alternative. The coated fiber bundle may be formed with a mat of looped coated fibers, such as was shown in FIG. 5, or pre-cut fibers, such as was shown in FIG. 6. FIGS. 15A and 15B illustrate a bundle 70 of coated fibers 72, with each coated fiber including a support fiber 74 and a coating layer 76. In the illustrated embodiment, the support fiber 74 is solid, but it may instead be hollow. One end of the bundle 70 is potted 78 with a potting material. This potting material may be the same as the material forming the coating layer 76 or outer portion of the coating layer, or a material that bonds thereto. As a next step, as shown in FIGS. 16A and 16B, a formed block 80 is molded or cast as a first potting layer on the second end of the bundle 70. This formed block 80 pots and bonds to the ends of the coated fiber at least at one end of the bundle. This formed block 80 may be said to be formed of a first material. As best shown in FIG. 16B, this block 80 is in contact with the support fibers 74 and the coating layer 76, and is bonded thereto. This formed block may also be referred to as a first potting layer or a first body of material. Then, a second potting layer 82 is formed adjacent to and inboard of the first potting layer 80, as shown in FIGS. 17A and 17B. This second potting layer 82 pots and bonds to the coating layers of the coated fibers inboard of the first potting layer, but does not bond to the first potting layer 80. The second potting layer 82 may be said to be formed of a second material, though the first and second materials may be the same material in some embodiments. The second potting layer may also be referred to as a second body of material. A mold release layer may be formed in between if necessary to prevent bonding of the potting layers to each other. Upon curing or hardening of the potting layers 80 and 82, the first potting layer 80 embeds the outermost portion on the coated fiber ends and the second potting layer 82 is bonded to the outer coating layer 76 inboard of the first potting layer 80. The first potting layer 80 is pulled away from the second potting layer 82 thereby stretching the coated fibers and tearing the coating layers 76 at the interphase between the potting layers as shown in FIGS. 18A and 18B. Upon pulling further, the support fibers 74 form necks with a reduced outer dimension. The necks propagate into the coated fiber effectively propagating the gap between the support fiber and the coating layer from one potted end to the other.

In FIGS. 15-18, the bundle 70 is shown as formed from coated fibers with cut ends. In an alternative approach, the bundle has looped ends. For example, a single coated fiber is wound back and forth to form the bundle. In this approach, a looped end interconnects pairs of fibers at each end. The method illustrated in FIGS. 15-18 may be used with these looped ends. In FIG. 16B, a loop of coated fiber would be embedded in the layer 80. The remainder of the method works in the same way. The looped end increases the attachment between the layer 80 and the coated fiber, since it is mechanically interconnected, in addition to any bonding.

According to another preferred embodiment of the present invention, the interface between the support fiber and the cured coating layer is disrupted by expanding the cured coating layer over the support fiber. That is, the inner surface of the coating layer may be said to have an inner dimension, such as an inner diameter if the inner surface is cylindrical. The coating layer may be expanded such that this inner dimension is increased from a first value to a second value. This can be accomplished by several methods. One preferred method involves swelling the cured coating layer by exposing it to a suitable substance that swells the coating material. For example, if the coating layer material is cured silicone, this layer can be expanded by exposing the outer surface of the coated fiber to a solvent such as xylene or toluene. The solvent swells the silicone and disrupts the interface between the coating layer and support fiber. Once the coating layer is expanded, the support fiber can be extracted, and the solvent can be subsequently flashed off retuning the coating layer to its original size.

According to yet another preferred embodiment of the present invention, the interface between the support fiber and the coating layer may be disrupted by forcing a fluid in between the fiber and the coating layer using fluid pressure. For example, a high pressure, low surface tension, low viscosity lubricant such as isopropyl alcohol can penetrate the interface between support fiber and the coating layer thus disrupting the interface, creating a gap, and enabling the support layer to be removed. The fluid can be supplied at a high pressure at a potted end of a bundle to force the fluid to penetrate and disrupt the interface. Once fluid enters the gap, a pressure differential between the inside and outside of the coating layer will be established and the coating layer will "inflate" to further disrupt the interface and allow the fluid to penetrate further. Vacuum or partial vacuum can also be applied on the outside of the coated layer to aid in expanding the coated layer. Only a small expansion of the coated layer is necessary to disrupt the interface and allow fluid to penetrate the gap. Vacuum and positive pressure can be applied continuously or intermittently to aid this disruption.

Once the fluid has penetrated the gap, then the support material can be removed from the coated layer by pushing using fluid pressure force applied on one end of the bundle, thus driving the support fibers out of the coated layers. Using a low viscosity, low surface tension liquid such as isopropyl alcohol to penetrate the gap as a lubricant can help dislodging the support fiber from the coated layer. Such a lubricant can easily penetrate the gap by capillary action.

Further methods in accordance with the present invention may make use of a combination of the above-described methods. For example, the support fiber may be contracted while the coating layer is expanded.

As will be clear to those of skill in the art, a variety of materials may be used in the embodiments of the present invention. Exemplary support fiber materials include minimally oriented or non-oriented polypropylene, polyethylene and PET. Exemplary coating layer materials include two part filled silicones, fluorinated polymers, polyvinyl alcohol, thermoplastic and crosslinked polyurethanes. Exemplary fluids for penetrating the gap include isopropyl alcohol, and water. Exemplary fluids for swelling the cured layer include xylene, heptane, and toluene.

The embodiments of the present invention are preferably used to create very small hollow tubes. For example, it is preferred that the resulting fibers have an outside dimension, typically a diameter, in the range of 50 to 500 microns and a coating layer, typically in the range of 5 to 100 microns thick.

As will be clear to those of skill in the art, the herein described embodiments of the present invention may be altered in various ways without departing from the scope or teaching of the present invention. It is the following claims, including all equivalents, which define the scope of the present invention.

I claim:

1. A method of forming a plurality of hollow fibers, comprising the steps of:
   providing an elongated flexible substantially continuous support fiber having an outer surface;
   coating the outer surface of the support fiber with a hollow fiber material;
   curing or hardening the hollow fiber material coating on the outer surface so as to form a substantially continuous and uniform coating layer on the outer surface of the support fiber, the coating layer having an inner surface adjacent the outer surface of the support fiber;
   forming the coated support fiber into a bundle having an end;
   potting the end of the bundle in a potting material so as to form a potted end;
   creating a gap between the outer surface of the intact support fiber and the inner surface of the coating layer defined thereon;
   cutting the coated support fiber into a plurality of fiber segments each having exposed ends; and
   removing the support fiber segments from the coating layers so as to provide a plurality of hollow fibers;
   wherein the potting step is performed prior to the removing step.

2. A method in accordance with claim 1, wherein the cutting step is performed prior to the gap creating step.

3. A method in accordance with claim 1, wherein the gap creating step is performed prior to the cutting step.

4. A method in accordance with claim 1, wherein:
the outer surface of the support fiber has an outer dimension and the inner surface of the coating layer has an inner dimension;
the step of creating a gap between the outer surface of the support fiber and the inner surface of the coating layer is accomplished with at least one gap creating process selected from a group consisting of:
expanding the cured coating layer so as to increase the inner dimension;
contracting the support fiber so as to decrease the outer dimension; and
using a pressurized fluid to penetrate between the outer surface of the support fiber and the inner surface of the coating layer.

5. A method in accordance with claim 1, wherein the gap creating step comprises expanding the cured coating layer by swelling the cured coating layer by exposing the cured coating layer to a substance operable to swell the cured coating layer, thereby increasing an inner dimension of the coating layer.

6. A method in accordance with claim 5, wherein the substance operable to swell the cured coating layer comprises xylene or toluene.

7. A method in accordance with claim 5, further comprising the step of evaporating the substance operable to swell the cured coating layer.

8. A method in accordance with claim 1, wherein the gap creating step comprises contracting the support fiber such that an outer dimension of the support fiber is reduced, the contracting step being accomplished with a contracting method selected from a group consisting of:
providing a support fiber with an outer dimension that expands with temperature, the support fiber being at a first temperature during coating with the hollow fiber material and the support fiber being at a second lower temperature for creation of the gap, the method further comprising cooling the support fiber from the first temperature to the second temperature;
providing a support fiber formed of a heat shrinkable material, the method further comprising heating the support fiber so as to reduce the outer dimension; and
stretching the support fiber relative to the outer coating layer, thereby reducing the outer dimension.

9. A method of forming a plurality of hollow fibers, comprising the steps of:
providing an elongated flexible substantially continuous support fiber having an outer surface;
coating the outer surface of the support fiber with a hollow fiber material;
curing or hardening the hollow fiber material coating on the outer surface so as to form a substantially continuous and uniform coating layer on the outer surface of the support fiber, the coating layer having an inner surface adjacent the outer surface of the support fiber;
creating a gap between the outer surface of the support fiber and the inner surface of the coating layer defined thereon;
cutting the coated support fiber into a plurality of fiber segments each having exposed ends; and
removing the support fiber segments from the coating layers so as to provide a plurality of hollow fibers;
wherein the gap creating step comprises using pressurized fluid to penetrate between the outer surface of the support fiber and the inner surface of the cured coating layer, the fluid comprising a low surface tension, low viscosity lubricant.

10. A method in accordance with claim 9, wherein the fluid is isopropyl alcohol.

11. A method in accordance with claim 9, further comprising applying at least a partial vacuum to the cured coating layer during the gap creating step.

12. A method in accordance with claim 9, wherein the fluid is further operable to cause swelling of the coating layer.

13. A method in accordance with claim 1, wherein the step of removing the support fiber comprises pushing the support fiber out of the cured coating layer with a fluid.

14. A method in accordance with claim 1, wherein:
the cutting step comprises cutting the potted end so as to cut the end of the bundle of coated support fiber, thereby cutting the coated support fiber into the plurality of coated support fiber segments, each having an end.

15. A method in accordance with claim 14, wherein the gap creating step is performed prior to the bundle forming step.

16. A method in accordance with claim 14, wherein the gap creating step is performed after the cutting of the potted end step.

17. A method in accordance with claim 1, wherein:
the forming the coated support fiber into a bundle step comprises forming the plurality of coated support fiber segments into a bundle having an end;
and
the cutting step comprises cutting the potted end so as to expose ends of the fiber segments.

18. A method in accordance with claim 1, wherein the outer surface of the support fiber is cylindrical with a substantially constant diameter.

19. A method in accordance with claim 1, wherein the hollow fiber material is silicone.

20. A method in accordance with claim 1, wherein the support fiber is hollow.

21. A method in accordance with claim 1, wherein the coating step comprises:
providing a coating die; and
passing the support fiber through the coating die.

22. A method in accordance with claim 1, wherein the coating step comprises coating the support fiber with multiple coating layers.

23. A method in accordance with claim 22, wherein the multiple coating layers include at least two different coating materials.

24. A method in accordance with claim 1, wherein the step of forming the coated fiber into a bundle comprises a forming process selected from a group consisting of:
winding the coated support fiber into bundle; and
knitting a plurality of coated fibers into a mat and spirally winding the mat into a bundle.

25. A method in accordance with claim 1, further comprising:
attaching a body of material to the support fibers at the exposed ends of the fiber segments at the potted end; and
moving the body of material away from the potted end such that the support fibers are stretched, the stretching of the support fibers causing an outer dimension of the support fibers to be reduced, thereby creating the gap.

26. A method in accordance with claim 1, wherein: further comprising:
the forming the coated support fiber into a bundle step comprises forming the plurality of coated support fiber segments into a bundle having a first and a second end;

the potting step comprising potting the first end of the bundle in a potting material so as to form a first potted end;

the method further comprising:

potting the second end of the bundle in a first material, thereby forming a first potting layer, the first potting layer bonding to the second end of the bundle;

potting the second end of the bundle, inboard of the first potting layer, in a second material, thereby forming a second potting layer, the second potting layer bonding to the coating layers of the bundle but not to the first potting layer; and moving the first potting layer away from the second potting layer such that the coating layers embedded in the first and second potting layers separate in between and the support fibers are stretched, the stretching of the support fibers causing an outer dimension of the support fibers to be reduced, thereby creating the gap.

27. A method in accordance with claim 26, further comprising the step of cutting the coated support fibers prior to forming the first potting layer, such that the ends of the coated fiber segments at the second end of the bundle are exposed.

28. A method of forming hollow fiber bundles, comprising the steps of:

providing an elongated flexible substantially continuous support fiber having an outer surface;

coating the outer surface of the support fiber with a hollow fiber material;

curing or hardening the hollow fiber material coating on the outer surface so as to form a substantially continuous and uniform coating layer on the outer surface of the support fiber, the coating layer having an inner surface adjacent the outer surface of the support fiber;

forming the coated support fiber into a bundle having an end;

potting the end in a potting material so as to form a potted end;

cutting the potted end so as to sever the end of the bundle of coated support fibers and create a plurality of coated support fiber segments each having an exposed end;

creating a gap between the outer surface of each intact support fiber segment and the cured layer defined on the outer surface thereof; and removing the support fiber from the cured layer so as to provide a bundle of hollow fibers.

\* \* \* \* \*

UNITED STATES PATENT AND TRADEMARK OFFICE
CERTIFICATE OF CORRECTION

PATENT NO. : 8,557,159 B2
APPLICATION NO. : 12/915262
DATED : October 15, 2013
INVENTOR(S) : Jean Patrick Montoya It is certified that error appears in the above-identified patent and that said Letters Patent is hereby corrected as shown below:

In the Claims

Claim 26, column 12, line 63, delete "further comprising".

Signed and Sealed this
Eighteenth Day of February, 2014

Michelle K. Lee
*Deputy Director of the United States Patent and Trademark Office*